United States Patent
Baum et al.

(10) Patent No.: US 9,538,311 B2
(45) Date of Patent: Jan. 3, 2017

(54) AUTO-PROVISIONING FOR INTERNET-OF-THINGS DEVICES

(71) Applicant: TEXAS INSTRUMENTS INCORPORATED, Dallas, TX (US)

(72) Inventors: Avraham Baum, Giva't Shmuel (IL); Ilan Zarmi, Alfey Menashea (IL); Gil Reiter, Plano, TX (US); Amir Ayun, Hod HaSharon (IL)

(73) Assignee: Texas Instruments Incorporated, Dallas, TX (US)

(*) Notice: Subject to any disclaimer, the term of this patent is extended or adjusted under 35 U.S.C. 154(b) by 66 days.

(21) Appl. No.: 14/611,397

(22) Filed: Feb. 2, 2015

(65) Prior Publication Data
US 2015/0222621 A1    Aug. 6, 2015

Related U.S. Application Data

(60) Provisional application No. 61/935,794, filed on Feb. 4, 2014.

(51) Int. Cl.
| | |
|---|---|
| *H04L 9/32* | (2006.01) |
| *H04L 9/00* | (2006.01) |
| *H04W 4/00* | (2009.01) |
| *H04L 29/06* | (2006.01) |
| *H04L 29/08* | (2006.01) |

(52) U.S. Cl.
CPC .......... *H04W 4/005* (2013.01); *H04L 63/0807* (2013.01); *H04L 63/0823* (2013.01); *H04L 67/12* (2013.01)

(58) Field of Classification Search
CPC .. H04L 63/08; H04L 63/0807; H04L 63/0853; H04L 63/0876; H04L 63/0869; G06F 21/44
USPC .......... 726/2–10; 713/168–172, 176
See application file for complete search history.

(56) References Cited

U.S. PATENT DOCUMENTS

| | | | |
|---|---|---|---|
| 8,473,002 B2* | 6/2013 | Escott ................ | H04L 63/0823 455/552.1 |
| 8,868,902 B1* | 10/2014 | Brown ................ | G06Q 20/322 713/155 |
| 9,100,175 B2* | 8/2015 | Nix ................ | H04L 9/0869 |
| 9,118,643 B2* | 8/2015 | Falk ................ | G06F 21/31 |
| 2015/0095648 A1* | 4/2015 | Nix ................ | H04W 52/0235 713/170 |

* cited by examiner

*Primary Examiner* — Hosuk Song
(74) *Attorney, Agent, or Firm* — Lawrence J. Bassuk; Charles A. Brill; Frank D. Cimino

(57) ABSTRACT

A connectivity device includes a microcontroller, a network interface coupled to the microcontroller, and a non-transitory storage device coupled to the microcontroller. The non-transitory storage device includes a token usable for authentication and including executable code. The token includes a unique device identifier (UDID) that uniquely identifies the authentication device and a private key. The executable code is to cause the microcontroller to initiate a registration process with an internet-of-things (IoT) server to register the token with the IoT server. Token creation and activation procedures are also described.

11 Claims, 6 Drawing Sheets

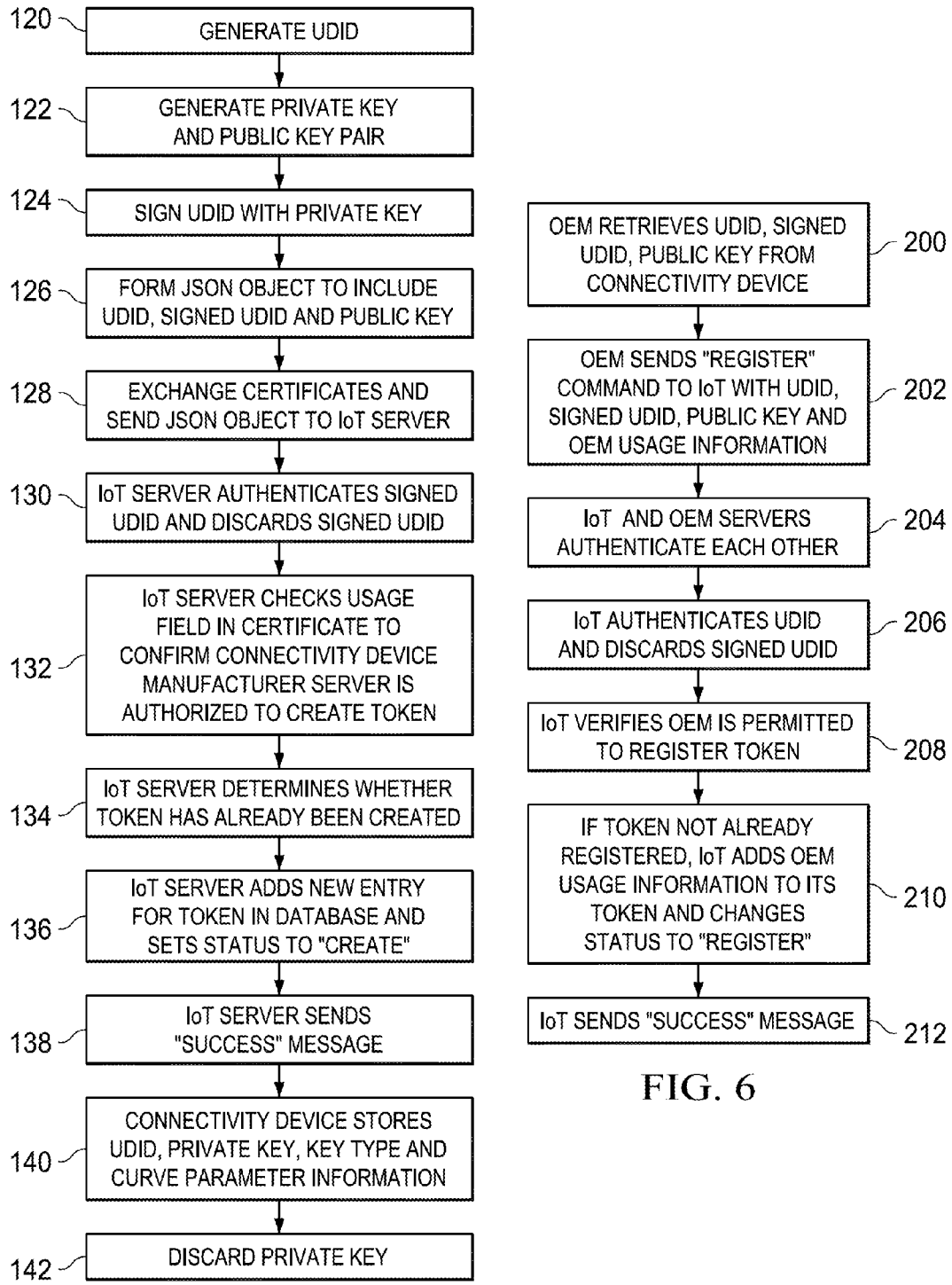

AUTO-PROVISIONING FOR INTERNET-OF-THINGS DEVICES

CROSS-REFERENCE TO RELATED APPLICATIONS

The present application claims priority to U.S. Provisional Patent Application No. 61/935,794, filed Feb. 4, 2014, titled "Seamless Auto-Provisioning For Internet-Of-Things Devices," which is hereby incorporated herein by reference in its entirety.

BACKGROUND

The Internet-of-Things (IoT) is the interconnection of various embedded devices. Such devices (called "things") may or may not have user-accessible input/output capability. For example, a thing may be an embedded sensor inside of a product such as a refrigerator or washing machine. Such a thing may not have a mouse, keyboard, display or any other type of user-accessible device by which a person can digitally interact with the thing.

For a device to connect to other devices over the Internet, the device generally needs to be provisioned. Provisioning a device includes programming the device to specify how it is to communicate over the Internet and possibly specifying what sort of data is to have access to, what services the device can access, etc.

Provisioning a thing in the context of the IoT may be problematic because of the large number of things on the IoT and because the thing may lack a human-accessible input/output capability.

SUMMARY

In one example, a connectivity device includes a microcontroller, a network interface coupled to the microcontroller, and a non-transitory storage device coupled to the microcontroller. The non-transitory storage device includes a token usable for authentication and including executable code. The token includes a unique device identifier (UDID) that uniquely identifies the authentication device and a private key. The executable code is to cause the microcontroller to initiate a registration process with an internet-of-things (IoT) server to register the token with the IoT server.

In another example, a server system includes a processor, a network interface coupled to the processor, and non-volatile storage accessible to the processor and containing executable code. When executed, the executable code causes the processor to receive a token command, a unique device identifier (UDID), and a signed UDID from a connectivity device, determine whether a token has already been created with the same received UDID, add an entry to a list of tokens, the added entry including the received UDID and set a state for the entry to CREATE, and cause a success message to be transmitted to the connectivity device.

In yet another example, a method includes generating a unique device identifier (UDID) for a connectivity device, signing the UDID with a private key unique to the connectivity device to generate a signed UDID, and transmitting the UDID, the signed UDID, and a public key to an internet-of-things (IoT) server. The method further includes transmitting create token command to the IoT server and, upon receipt of a token creation success message from the IoT server, storing the UDID and private key on the connectivity device.

Yet another example is directed to a method that includes receiving the UDID, the signed UDID, and a public key from a connectivity device, authenticating the signed UDID using the public key, receiving a token create command form the connectivity device, updating a list of tokens to include a token entry containing the received UDID, setting a status of the token entry to "CREATE," and sending a token create success message to the connectivity device.

BRIEF DESCRIPTION OF THE DRAWINGS

For a detailed description of exemplary embodiments of the invention, reference will now be made to the accompanying drawings in which:

FIG. 5 illustrates a token creation procedure in accordance with various examples;

FIG. 6 illustrates a product registration procedure in accordance with various examples;

DETAILED DESCRIPTION

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
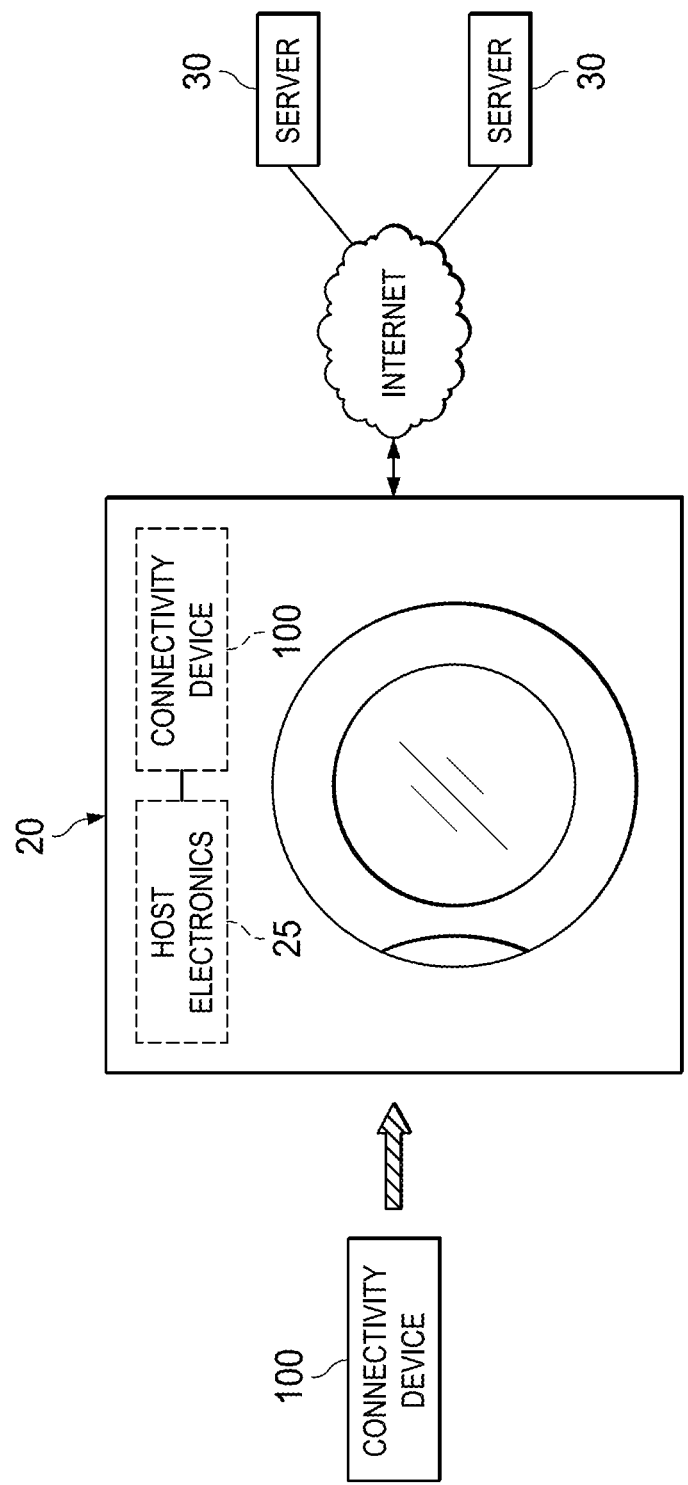
FIG. 1 shows a product containing a connectivity device that provides Internet connectivity for the product in accordance with various examples.

FIG. 1 shows an example of a product 20 that includes a connectivity device 10. The product 20 in the example of FIG. 1 is shown to be a washing machine, but can by any type of product in other examples. With the connectivity device 100, the product 20 has internet connectivity to one or more servers 30. Through operation of its connectivity device 100, host electronics 25 in the product 20 is able to provide any type of desired network functionality for the product. For example, a washing machine could report its status, number of loads of laundry, etc. to an online service. If the washing machine has finished a load of laundry, the connectivity device could report that status to the online service which, in turn, may send a laundry status alert to the user.

Figure 2:
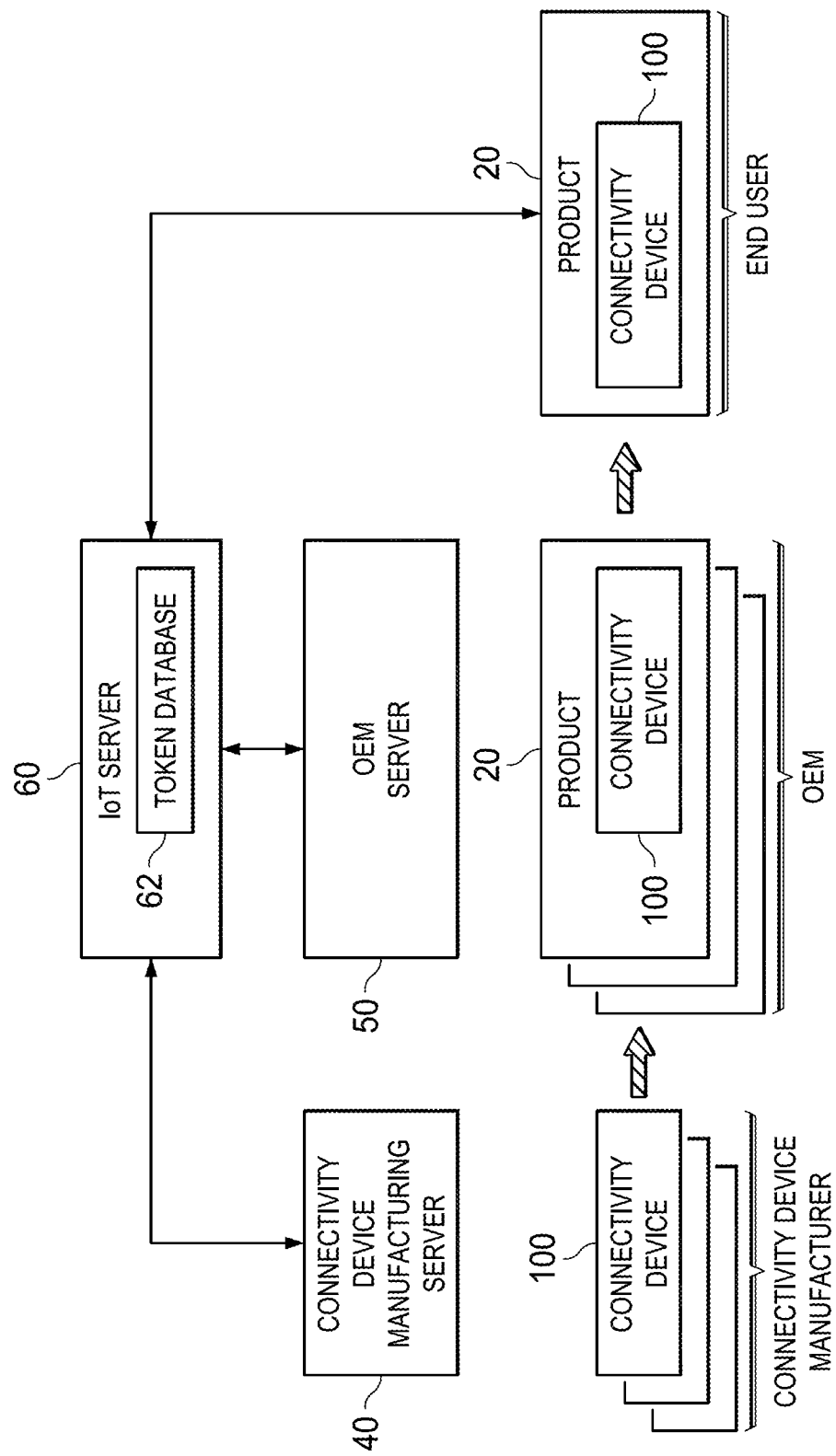
FIG. 2 illustrates an example of the lifecycle of the connectivity device in accordance with various examples.

FIG. 2 illustrates the life cycle of the connectivity devices 100 as they and the products in which they are included progress through a distribution chain. A connectivity device manufacturer manufactures the connectivity devices 100. The connectivity device 100 is then installed in a product 20 by an original equipment manufacturer (OEM). The product 20 is eventually purchased and used by an end user. The product 20 may be sold to the end user through one or more distributors and a reseller (not specifically shown).

To be usable, the connectivity device 20 should be provisioned. Provisioning the connectivity device 20 may include a series of procedures in which a connectivity device 10 may be involved along its life-cycle from its manufacturing to its use in a product 20 by an end user. An IoT server 60 is involved in the various provisioning procedures. An example of the provisioning procedures includes the creation of an IoT token which is a unique representation for the connectivity device 100. The IoT token (also referred to herein simply as the "token") includes credentials by which the IoT server 60 can authenticate the server communicating the token to the IoT server 60. The token also may include product usage information which may specify various data and functions the product 20 may acquire/perform. Such data and the results of the functions may be communicated to an on-line service (through a server, not shown) to provide IoT functionality for the product. The token creation procedure may be performed through interaction of a connectivity device manufacturer server 40 and the IoT server 60.

OEMs then purchase the connectivity devices. The OEM installs the connectivity devices 100 in its products 20. A token registration process is performed at the OEM location to register the product 20 with the connectivity device 100 at the IoT server 60. The OEM may include an OEM server 50 to perform the token registration procedure with the IoT server 60. Registration of the product 20 by the OEM makes the product ready for activation. At least part of the token registration procedure includes communication to the IoT server of information that specifies how the product is to use the connectivity device 100. Such information may include, for example, properties of the product, web services to which the product has access, and functional rules that apply to the product. Examples of product properties include the operational state of the product (e.g., rinse, wash, cycle complete, etc. in the context of a washing machine product), which properties are read-only, read-write etc. A read-only property is a property of the product that can only be read from a remote service via the connectivity device, while a read-write property can be modified as well. For example, a remote server may be able to turn the washing machine off by changing the operational state property through the connectivity device. An example of web service for a washing machine may be a service that automatically generates an alert and possibly orders a service call if a remote server receives a message from the product through the connectivity device that the washing machine has experienced a malfunction. An example of a functional rule for a washing machine is that if a temperature sensor in the product reports a temperature in excess of a threshold temperature, a remote service is permitted to send a signal back to the washing machine to turn it off. The aforementioned examples are just that—examples the information that specifies how the product is to be used can be varied as desired.

Following the product registration procedure, an end user may obtain (e.g., by purchasing) the product 20. The end user causes an activation procedure to occur in which the product 20 communicates with the IoT server 60 to activate the product. Once the product 20 is activated, the product can be used with internet connectivity using its connectivity device.

The token mentioned above may be implemented as a data structure that includes data that contains rules that define the connectivity device's behavior in terms of where it is along its lifecycle. The token is scalable meaning that it can be modified and expanded as the connectivity moves from connectivity device manufacturer to end user. Further, the token may include various predefined records that are commonly identified by all entities involved in the provisioning of the connectivity device. The token includes credentials that permit authentication procedures to occur at each step of the provisioning process.

Figure 3:
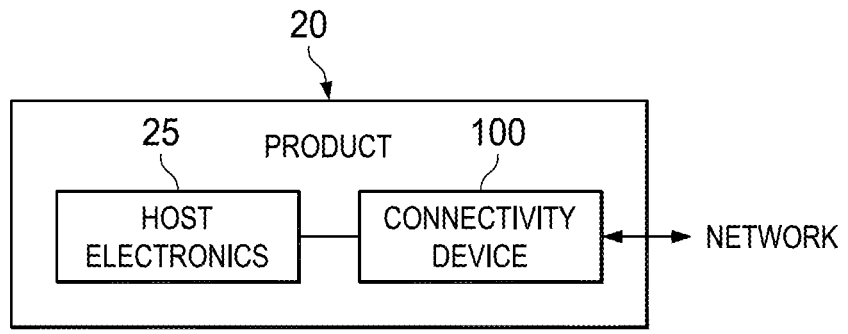
FIG. 3 shows an example of a product containing a connectivity device in accordance with various examples.

FIG. 3 illustrates an example of a product 20. The product 20 may include host electronics 25 coupled to the connectivity device 100. The host electronics 25 provide product-specific functionality for the product. In the example of the washing machine, the host electronics 25 may count the number of loads of clothes run through the washing machine, its health and status, etc. Such information may be transmitted to a server over a network through the connectivity device 100. The functionality performed by the host electronics 25 is specific to the particular product 20.

Figure 4:
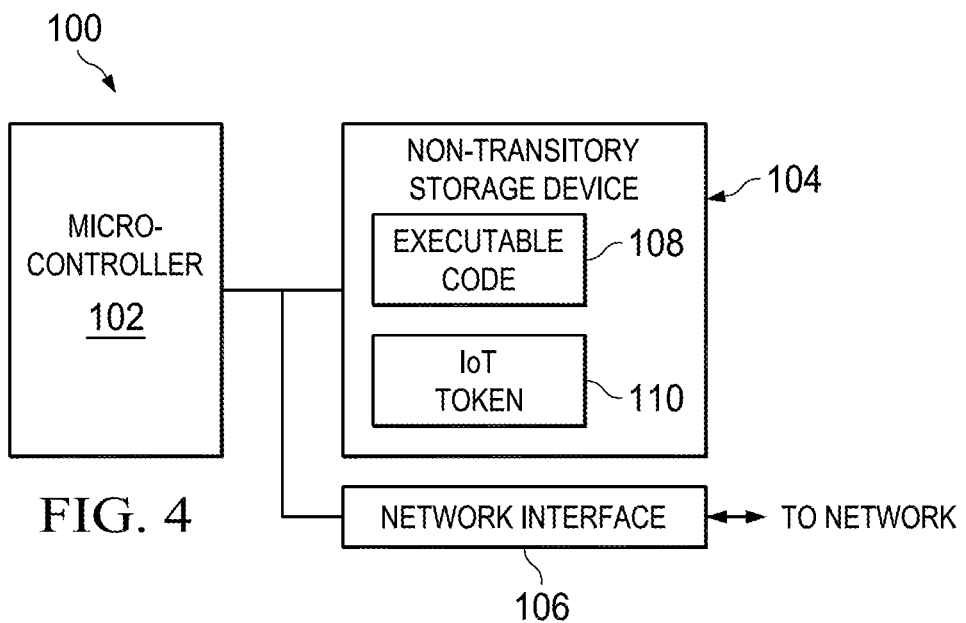
FIG. 4 shows an example of a connectivity device containing an IoT token in accordance with various examples.

FIG. 4 shows an example of a connectivity device 100. As shown in the example of FIG. 4, the connectivity device 100 includes a microcontroller 102 coupled to a non-transitory storage device 104 and a network interface 106. The non-transitory storage device 104 is implemented as a volatile or non-volatile storage device. Examples of non-volatile storage devices include flash storage, reprogrammable read only memory, magnetic storage, optical storage, etc. The non-transitory storage device 104 may be separate from the microcontroller 102 or may be included as part of the microcontroller. The storage device 104 may be secured in that it may be equipped to ensure that access to its content (either in whole or in part) is restricted to trusted entities. For example, one implementation, the storage device may be implemented as an external serial flash storage device (external to the microcontroller 102) and its contents are encrypted and signed. The network interface 106 may be implemented as a wireless interface using a protocol such as any of the IEEE 802.11x family of wireless protocols WiFi), BlueTooth, etc. In some examples, the network interface 106 may be a wired connection rather than a wireless interface. The network interface 106 provides the connectivity device 100 with connectivity to a network as shown. Through the network, the connectivity device 100 may establish a communication link to the IoT server 60 or to another server to interact with a product 20 containing the connectivity device 100 during normal product operations.

The non-transitory storage device 104 may include executable code 108 that is executed by the microcontroller 102. Upon execution of the code 108 by the microcontroller 102, the microcontroller is able to perform at least some, if not all, of the functionality described herein as attributed to the connectivity device 100. The non-transitory storage device 104 may also store the IoT token 110.

Token Creation

FIG. 5 illustrates an example of a token creation procedure. The token creation procedure preferably is performed by the entity that manufactured the connectivity device 100 and preferably before the connectivity device is provided to the OEM for installation in a product. As detailed below, during the token creation procedure, the IoT server 60 and connectivity device manufacturer server 40 authenticate each another, and information for an IoT token is generated on the connectivity device manufacturer server 40 and transmitted to the IoT server 60 for a token to be included its token database 62. The various operations illustrated in FIG. 5 may be performed in the order shown, or in a different order. Further, two or more of the operations may be performed in parallel rather than sequentially.

At 120, the token creation procedure includes the connectivity device manufacturer server 40 generating a globally unique device identifier (UDID) for the connectivity device 100 whose token is to be created. In one example, the UDID may be a 128-bit value (or other number of bits) that preferably is unique with respect to all other connectivity devices 100. The UDID may be generated according RFC4122, using the random numbers method (version 4). The UDID is a public value (i.e., need not be kept secret) which also serves as the token identifier.

At 122, the connectivity device manufacturer server 40 generates a private/public key pair for the connectivity device 100. In one example, the keys are each 256 bits (or other number of bits) and may be generated using the elliptic curve digital signature algorithm (ECDSA). The set of domain parameters (i.e., the curve parameters) that may be used in the ECDSA should be chosen apriori and should be known to all parties (e.g., IoT server 60, connectivity device manufacturer server 40, and connectivity device 100). The curve parameters are chosen by the connectivity device manufacturer as part of the generation of the private/public key pair from a set of predefined curve parameters. The chosen set of curve parameters form part of the token itself and are burned into the connectivity device so that the IoT sever 60 will be able to determine which curve parameters to use. Another option is to define an enumeration value that represents a set of pre-defined curve parameter, and the enumeration value is burned into the connectivity device rather than the curve parameters themselves.

At 124, the token creation procedure includes the connectivity device manufacturer server 40 signing the UDID with the private key to form a signed UDID. This operation may include the connectivity device manufacturer server 40 computing a hash of the UDID and encrypting the hash with the private key. The encrypted hash is the signed UDID. At 126, the procedure further includes forming a JavaScript Object Notation (JSON) object (or other object format) to include the UDID, the signed UDID, and the public key. At 128, the IoT server 60 and connectivity device manufacturer server 40 exchange certificates and the connectivity device manufacturer server 40 transmits the JSON object to the IoT server 60. Each of the connectivity device manufacturer and IoT servers 40, 60 preferably has its own X.509 public key certificate, signed at an agreed certificate authority (CA), in order to validate the authenticity of the other server. All communications between the servers 40, 60 may be performed over a secure link (e.g., Secure Sockets Layer (SSL)) using such certificates. In its certificate, the connectivity device manufacturer server 40 defines that the usage of the certificate (besides the standard usages in the "key usage" field) is for IoT token creation. This usage definition may be defined in the "extended key usage field in the certificate and is used by the IoT server 60 to confirm that the server 40 has permission to create a token.

At 130, the IoT server 60, having received the JSON object and connectivity device manufacturer server certificate, authenticates the signed UDID and then discards the signed UDID. Authenticating the signed UDID may include the IoT server 60 using the public key provided in the JSON object to decrypt the encrypted hash of the UDID to thereby recover the original UDID. The IoT server may then compare the recovered UDID to the UDID provided in the JSON. If the two UDIDs match, then IoT server 60 has increased confidence that the UDID is valid. If the UDIDs do not match, the IoT server 60 may generate an alert and the connectivity device 100 will not be able to progress towards activation and usage in the product 20 by the end user. That is, the product 20 may be usable for its intended purpose but may not have any internet connectivity through the connectivity device—the connectivity device will not become activated. In other scenarios, an alert generated by the IoT server 60 may be received by the OEM thereby causing the OEM to investigate the source of the problem. Operation 130 may also include the connectivity device manufacturer server 40 authenticating the certificate provided to it by the IoT server.

At 132, the IoT server 60 checks the usage field of the certificate from the connectivity device manufacturer server 40 to confirm that the server 40 is authorized to create tokens. If the connectivity device manufacturer server 40 is not authorized to create tokens, then the token creation process ends, and the connectivity device will fail to be activated for use in the product. Otherwise, at 134, the IoT server 60 determines whether the token has already been created in its database 62. Each token is identified by the device's UDID and the IoT server 60 determines whether a token already exists in its database 62 with the same UDID value. If a token with the same UDID already exists, then, in one example, the IoT server 60 sends a "FAIL" message back to the connectivity device manufacturer server 40, which may cause the server 40 to generate a new UDID or drop the connectivity device altogether from the provisioning process. Otherwise, at 136 the IoT server 60 adds an entry to its database 62 for the token to be created. The newly added entry includes the UDID and the public key received in the JSON object. Further, each token entry includes a "state" value. The state value for the newly added token entry is set to "CREATE" to indicate the token has now been created in the IoT server 60.

At 138, the IoT server 60 sends a token creation "SUCCESS" message back to the connectivity device manufacturer server 40 to indicate the successful creation of the token. At 140 and upon receiving the SUCCESS message from the IoT server 60, the connectivity device manufacturer server 40 stores any or all of the UDID, private key, a key type and the curve parameter information (curve parameters themselves or the enumeration value noted above) into the IoT token 110 in the storage device 104 of the connectivity device 100.

At 142, the connectivity device manufacturer preferably discards the private key for increased security. The private key should not be kept on the server 40.

Product Registration

At this point, the token has been created by the IoT server 60. The above-described token creation procedure preferably is performed for each connectivity device 100 created. The database 62 in the IoT server 60 thus includes an entry for all of the tokens of the various connectivity devices. The connectivity devices may be provided to (e.g., sold) to OEMs, who, in turn, install the connectivity devices in their products. A product registration procedure preferably is performed at this point with the connectivity device 100 under the control and/or ownership of the OEM. The registration procedure involves the use of the IoT sever 60 and includes various security checks performed by the IoT server. During the registration process, the OEM communicates to the IoT server its intended use of the connectivity device 100 in the product 20. This disclosure includes two illustrative product registration procedures. One registration is shown in FIG. 6 and the other in FIG. 7.

FIG. 6 illustrates an example of one of the token creation procedures and is performed, in part, using the OEM server 50 to communicate with the IoT server. As detailed below and in FIG. 7, during the product registration procedure, the IoT server 60 is informed of the intended use of the connectivity device 100 by the product 20. Examples of intended uses are provided above. The usage information is stored in the token in the IoT server database 62. The various operations illustrated in FIG. 6 may be performed in the order shown, or in a different order. Further, two or more of the operations may be performed in parallel rather than sequentially.

As with the token creation procedure, the OEM server 50 and the IoT server 60 have their own X.50 public key certificates, signed at an agreed CA authority. The certificates are used by the servers 50, 60 to authenticate each other during the product registration procedure. All communications between the OEM and IoT servers 50, 60 preferably occur over secured links (e.g., SSL) using the certificates.

At 200, the OEM server 50 retrieves the UDID of the connectivity device 100 of the product 20 that the OEM wants to register, as well as the signed UDID and public key from the connectivity device. For example, as part of the production line activities, the OEM server 50 may communicate with the connectivity device 100 installed in the product 20 to obtain its UDID. During the token creation procedure as described above, the token 110 for the connectivity device 100 is stored in the non-transitory storage device 104, and the token 110 includes the connectivity device's UDID. The UDID may be transmitted to the OEM server 50 via the connectivity device's network interface 106. Similarly, the OEM server 50 may obtain the signed UDID and the public key from the connectivity device. The public key is also part of the token stored in the connectivity device. Upon request, the signed UDID may be computed by the connectivity device 100 through use of its private key. By having the connectivity device 100 sign the UDID (rather than providing the private key to the OEM server 50), security is enhanced.

At 202, the OEM server 50 sends a "REGISTER PRODUCT" command to the IoT server 60 with the UDID, signed UDID, public key and OEM usage information. The OEM usage information includes information that indicates how the product will use the connectivity device 100.

At 204, the OEM and IOT servers 50, 60 establish an SSL connection and authenticate each other using the certificates noted above. At 206, the registration procedure includes the IoT server 60 authenticating the UDID provided by the OEM server 50 and then discarding the signed UDID. The UDID authentication operation may be performed as described previously using the public key, UDID, and signed UDID supplied from the connectivity device 100 through OEM server 50.

At 208, the IoT server 60 checks the usage field in the certificate from the OEM server 50 to confirm that the OEM server is authorized to register products. If the usage field indicates that the OEM server is not authorized to register products, then the product registration procedure may terminate and the connectivity device 100 may not be activated for use in the product 20. If, however, the usage field indicates that that OEM server is indeed authorized to register products, then at 210, assuming the token identified by the UDID provided by the OEM server 50 is not already indicated as being registered in database 62 in the IoT server, the IoT server adds the received OEM usage information to the token in database 62 and changes its status to "REGISTER." At 212, the IoT server 60 sends a "SUCCESS" message back to the OEM server 50 to indicate that the product has been successfully registered at the IoT server 60.

Figure 7:
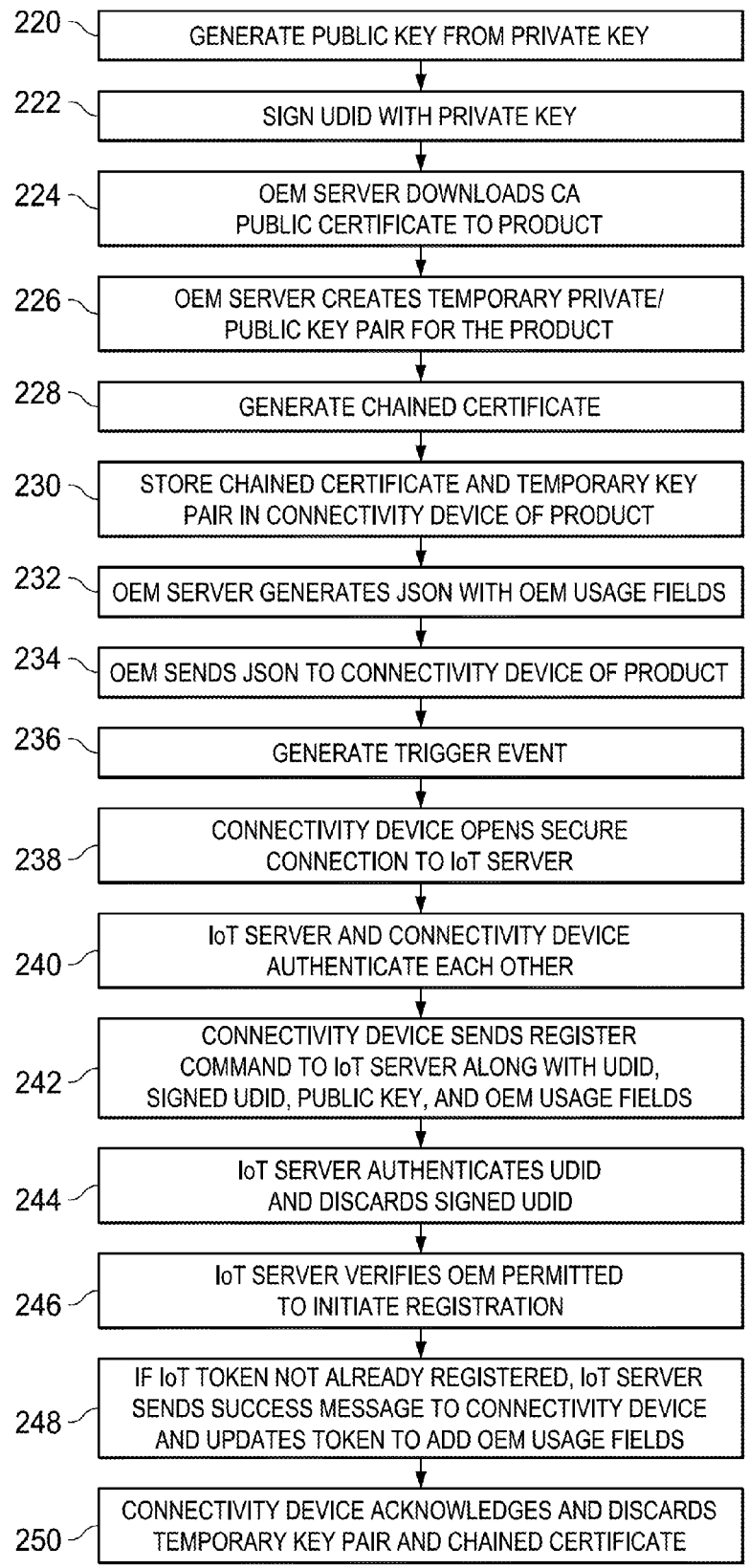
FIG. 7 illustrates another example of a product registration procedure in accordance with various examples.
Figure 8:
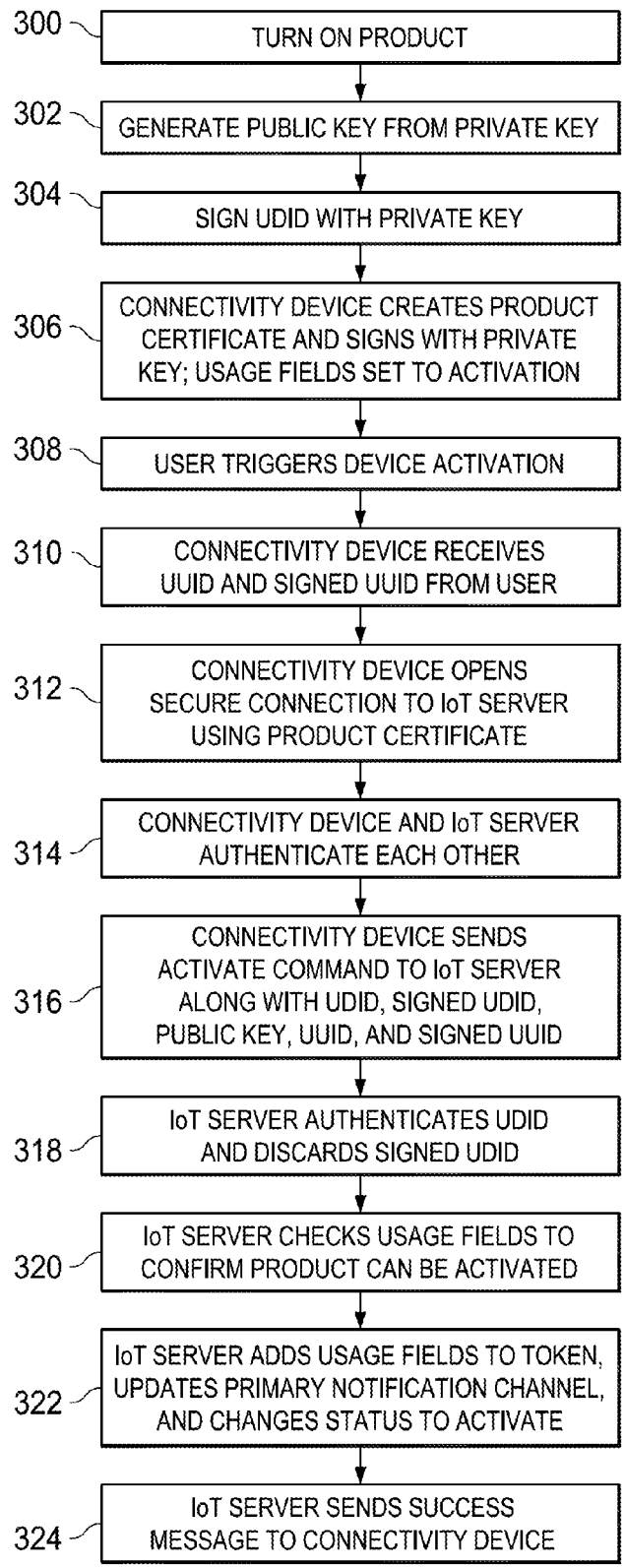
FIG. 8 illustrates a product activation procedure in accordance with various examples.

FIG. 7 shows an example of a product registration procedure that does not involve the OEM server 50 communicating with the IoT server 60. Instead, communications with the IoT server 60 occur directly with the connectivity device 100 in the product 20. In this example, the product 20 acts as a delegate of the OEM server 50. The OEM server 50 prepares a temporary certificate that will be used by the product 20 to communicate with the IoT server 60. The various operations illustrated in FIG. 7 may be performed in the order shown, or in a different order. Further, two or more of the operations may be performed in parallel rather than sequentially.

At 220, based on the product being powered on, the connectivity device 100 preferably generates a public key from its private key (stored as part of its token 110 in storage device 104) using the ECDSA. At 222, the connectivity device also signs its UDID using the private key by employing, for example, the SHA-1 function. The connectivity device 100 then waits for a trigger event (explained below).

At 224, the OEM server 50 downloads the CA public certificate to the product 20 (e.g., stored in the storage device 104 of the connectivity device 100) to subsequently be used by the product to authenticate the IoT server and, at 226, the OEM server 50 creates a temporary private key/public key pair. The OEM server 50 generates a chained certificate at 228 using the ECDSA. The OEM server 50 may create the chained certificate as follows. The first certificate in the chain is the original OEM CA public certificate previously downloaded to the product in which the "subject name" is the OWEM and the keys being used are the original OEM private/public key pair (i.e., the public key generated from operation 220 and the private key used to generate the public key). The second certificate in the chain preferably has the UDID of the connectivity device as the "subject name" and uses the temporary private/public key pair created by the OEM server 50 at 226.

At 230, the registration procedure includes storing the chained certificate and temporary key pair in the storage device 104 of the connectivity device 100. The product 20 will use this certificate and key pair to establish an SSL connection to the IoT server 60. At 232, the OEM server 50 generates a JSON object with the OEM fields that it wants to add to the IoT token. The OEM fields specify how the OEM's product intends to use the connectivity device 100 and specifies REGISTER in the usage fields as well to specify the OEM's intent to register the product through the product-to-IoT server connection. At 234, the OEM server sends the JSON object with the OEM usage fields to the connectivity device 100 of the product where the JSON object is stored in the connectivity device's storage device 104.

At this point, the OEM server 50 initiates a trigger event (236) to the product 20. The trigger event may include the OEM server sending a signal to the microcontroller 102 through the network interface 106. Upon detecting the trigger event, the connectivity device 100 at 238 opens a secure (e.g., SSL) connection to the IoT server 60, and the IoT server 60 and connectivity device 100 authenticate each other at 240 through exchange of the certificates. The IoT server validates that the product is identified as a delegate of the OEM by validating the OEM temporary CA public certificate. The product 20 authenticates the IoT server 60 by validating its certificate (and using the CA public certificate).

At 242, once the IoT server 60 and connectivity device 100 have authenticated each other, the connectivity device sends a "REGISTER" command to the IoT server along with its UDID, signed UDID, public key and OEM usage field information. Upon receiving the REGISTER command and other information, the IoT server 60 authenticates the signed UDID using the received public key and then discards the signed UDID (244). At 246, the IoT server verifies that the OEM usage field information permits the product to initiate the registration process. If the token specified by the UDID value is not already registered, the IoT server 60 sends a "SUCCESS" message to the connectivity device and updates its token in database 62 to add the OEM usage field(s) to the token. If the token is already registered, the IoT server may generate an alert and the provisioning process for that particular connectivity device may be halted. The connectivity device 100, upon receipt of the SUCCESS message, returns an acknowledgment to the IoT server 60 and discards the temporary key pair and chained certificate created in operations 226 and 228.

Following product registration, downstream distributors and/or resellers can perform procedures similar to the registration procedure for purposes updating the connectivity device's token. Similar security, authentication checks are made and an UPDATE TOKEN command is sent to the IoT server 60. The UPDATE TOKEN command may include additional product usage information that the distributor/reseller desires to specify for the product and the IoT server updates its token with such information. As the connectivity device 100 passes hands from device manufacturer to OEM to reseller (the downstream direction), upstream entities may lock out certain device-related token changes from being made by downstream entities. For example, the OEM may specify that a particular product property is read-only. Consequently, a downstream entity will not be able to change that particular property to read-write.

Activation

Activation of the product 20 is the last step in the provisioning process. Once activated, the product is associated to a specific user and it then has all of the IoT capabilities that are described in its token. At the end of a successful activation, the product is authorized to start accessing network services and send notifications to its user or other related IoT devices. Activation is initiated by the end user of the product. Each such user has his or her own unique user identifier (UUID). The UUID is created once for the user and the user uses that UUID when activating each of the user's products containing a connectivity device 100. The UUID creation process may be part of a registration process for the user. During that process, the user may create an online account including the user's name, address, email address and/or other pertinent information and may select or otherwise cause to be created a UUID for the user. A private key is generated for exclusive use on behalf of the user.

At 300, the product is switched on by the user. Enabling power to the connectivity device for the first time triggers the activation procedure. The activation procedure preferably is easy for the user to initiate and simply plugging the product's power cord into an electrical outlet and turning the product on comports the preferred simplicity objective of the activation initiation procedure. Upon being powered on, at 302 the product's connectivity device 100 generates its public key from the private key stored therein using the ECDSA. The connectivity device also signs its UDID using its private key (304).

The product (i.e., the connectivity device) then at 306 creates its public certificate, signs the certificate with its private key, and sets the usage field in the certificate to "ACTIVATION." The subject name of the public certificate is set to the UDID for the connectivity device. The product preferably saves the certificate in the storage device 104 (or other non-volatile storage device outside the connectivity device) for subsequent wake-up.

At this point, the product waits for a user-initiated trigger event. At 308, the user triggers activation of the product. An example of a user-initiated trigger event includes the user scanning a Quick Response (QR) code by, for example, a smart phone. The QR code may be printed on the packaging materials in which the product was shipped. A message may also be printed on the packaging materials or owner's manual instructing the user to turn on the product and scan the QR code to activate the IoT capability of the product. The user's UUID may be stored in or otherwise accessible to the user's smart phone. Upon scanning the QR code, at 310 the smart phone transfers the UUID and the signed UUID (signed with the user's own private key) to the product's connectivity device 100. The connectivity device 100 opens a secure connection (e.g., SSL) to the IoT server 60 using the product's certificate created as explained above. The IoT server 60 preferably uses the product's certificate to authenticate the product's identity and the product also authenticates the IoT server by validating the IoT server's certificate received by the product (operation 314).

Once communication is established between product 20 and IoT server 60 (following authentication), the product sends an ACTIVATE command to the IoT server along with the connectivity device's UDID, signed UDID, and public key, as well as the user's UUID and signed UUID (316). At 318, the IoT server 60 authenticates the UDID using the connectivity device's public key and then discards the signed UDID. At 320, IoT server checks the usage fields in the product's certificate to confirm that the product 20 is permitted to be activated. If the above tests are successfully passed (UDID is successfully authenticated and product is permitted to be activated), at 322, the IoT server updates its token corresponding to the UDID to ACTIVE (from REGISTER) and adds the primary notification channel information as well. A primary notification channel specifies the preferred form of communication. The connectivity device itself has a primary notification channel as does the user. The primary notification channel for the connectivity device may include a specific IP address or other communication channel characteristics for how remote servers are to send messages to the connectivity device. A primary notification channel for a user may include the user's account identification, an email address or a phone number for a smart phone for a text message. The IoT server 60 sends an activation SUCCESS message back to the product's connectivity device 100 (via the specified primary notification channel for the connectivity device) and the connectivity device may return an acknowledgment.

For added security, the IoT server, before activating the product, may ask the user to confirm the activation procedure using the primary notification channel specified for the user. For example, the IoT server may send a message to the user via a text message requesting an explicit confirmation. The user may receive the message through, for example, the smart phone or a computer. In this example, the IoT server will continue with the activation procedure only upon receiving an explicit confirmation from the user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A connectivity device, comprising:
   a microcontroller;
   a network interface coupled to the microcontroller; and
   a non-transitory storage device coupled to the microcontroller, the non-transitory storage device including a token usable for authentication and including executable code;
   in which the token includes a unique device identifier (UDID) that uniquely identifies the authentication device and a private key; and
   in which the executable code is to cause the microcontroller to initiate a registration process with an internet-of-things (IoT) server to register the token with the IoT server;
   in which powering up the connectivity device causes the executable code to cause the microcontroller to generate a public key from the private key and to sign the UDID using the private key to form a signed UDID;
   in which the network interface is to receive a temporary public/private key pair and chained certificate which includes a plurality of certificates; and
   in which, upon execution of the executable code, the microcontroller opens a secure connection to the IoT server, causes the network interface to transmit the chained certificate to the IoT server, authenticates the IoT server, and causes the network interface to transmit a register token command to the IoT server along with the UDID, a signed UDID, and the public key.

2. The connectivity device of claim 1 in which the executable code is to cause the microcontroller to initiate an activation process with the IoT server to activate the connectivity device to begin accessing web services during operation of a product in which the connectivity device is installable.

3. The connectivity device of claim 2 in which the executable code is to cause the microcontroller to generate a product certificate including a usage field that indicates that the authentication device can cause the activation process to occur, and to sign the product certificate with the private key.

4. The connectivity device of claim 3 in which the executable code is to cause the microcontroller to open a secure connection to the IoT server using the product certificate, to authenticate the IoT server, to cause the network interface to transmit an activate command to the IoT server, and to receive an activation success message from the IoT server.

5. A server system, comprising:
   a processor;
   a network interface coupled to the processor; and
   non-volatile storage accessible to the processor and containing executable code;
   in which, when executed, the executable code causes the processor to:
   receive a token command, a unique device identifier (UDID), and a signed UDID from a connectivity device;
   determine whether a token has already been created with the same received UDID;
   add an entry to a list of tokens, the added entry including the received UDID and set a state for the entry to CREATE; and
   cause a success message to be transmitted to the connectivity device;
   in which, when executed, the executable code causes the processor to change the state from CREATE to REGISTER upon receipt of a register command; and
   in which, when executed, the executable code causes the processor to add product usage information to the entry associated with the UDID, the product including the connectivity device.

6. The server system of claim 5 in which, when executed, the executable code causes the processor to receive a public key from the connectivity device and to authenticate the signed UDID using the public key.

7. The server system of claim 6 in which, after authenticating the signed UDID, the executable code causes the processor to discard the signed UDID and not save the signed UDID.

8. The server system of claim 5 in which, when executed, the executable code causes the processor to change the state from REGISTER to ACTIVATE upon receipt of an activate command.

9. The server system of claim 8 in which, when executed, the executable code causes the processor to confirm usage field for product containing the authentication code permits the connectivity device to be activated.

10. A method, comprising:
    receiving the UDID, the signed UDID, and a public key from a connectivity device;
    authenticating the signed UDID using the public key;
    receiving a token create command form the connectivity device;
    updating a list of tokens to include a token entry containing the received UDID;
    setting a status of the token entry to "CREATE";
    sending a token create success message to the connectivity device;
    receiving a credential from a manufacturer of a product to include the connectivity device;
    authenticating the credential;
    receiving a token registration command form the manufacturer;
    setting the status of the token entry to "REGISTER"; and
    sending a token register success message to the manufacturer.

11. The method of claim 10 including:
    receiving a credential from the product to include the authentication device;
    authenticating the credential;
    receiving a device activation command from the product;
    setting the status of the token entry to "ACTIVATE"; and
    sending a device activation success message to the product.

* * * * *